3,202,476
USE OF NICKEL ARSENIDES AND NICKEL TO PROMOTE PHASE SEPARATION IN LIQUID-LIQUID EXTRACTION
Thomas Joseph Collopy, Cincinnati, Ohio, John Herbert Mueller, Fort Thomas, Ky., and Wendell Sims Miller, Cincinnati, Ohio, assignors to the United States of America as represented by the United States Atomic Energy Commission
No Drawing. Filed Dec. 4, 1963, Ser. No. 328,141
9 Claims. (Cl. 23—14.5)

Our invention relates to liquid-liquid extraction and more particularly to a method of improving the separation of the aqueous phase from the organic phase in liquid-liquid extraction processes.

Liquid-liquid solvent extraction processes wherein an aqueous solution is contacted with an organic solvent phase to effect selective transfer of a given material into the organic solvent are employed for a wide variety of applications. In the nuclear energy field uranium ore concentrates are purified on a large scale by dissolving the concentrate in nitric acid, contacting the solution with an organic solution of tributyl phosphate in an inert diluent to selectively extract the uranium, washing the resulting uranium-bearing organic phase and re-extracting the purified uranium into aqueous solution. The organic solvent is recycled and reused until extraction performance is reduced to an uneconomical level by the presence of solvent degradation products. Further details of this process may be seen by reference to pages 146–180 of the book, Uranium Production Technology by C. D. Harrington and A. E. Ruehle, Van Nostrand (1959).

One of the problems encountered in purification of uranium ore concentrates by this process is deposition of solids at the aqueous-organic interface in extraction pulse-columns. The buildup of solids at the interface results from poor separation of the two phases. The aqueous phase is dispersed as fine droplets in the organic phase, and coalescence of the droplets into a continuous phase takes place slowly. These conditions are favorable to development of a stable emulsion and deposition of emulsified solids. The solids interfere with column operation, and periodic drainage of the columns and removal of the solids have been required. This measure not only interrupts production, but also generates a waste stream requiring further processing or storage.

In addition to allowing the formation of stable emulsions, poor phase separation has been a limiting factor in the attainment of high production rates. The time required for coalescence or phase separation affects the rate at which the two phases may be pumped through the extraction column. A decrease in coalescence time would allow a higher throughput and a resulting increased production rate.

Another problem in solvent extraction purification of uranium ore concentrates has been degradation of the organic solvent. After extended use tributyl phosphate decomposes due to chemical reactions such as hydrolysis, and the presence of decomposition products increases coalescence time and reduces extraction capacity. Further use of recycled solvent has required processing to remove decomposition products. Additional methods of improving the performance of used solvent are desired to reduce processing costs.

It is desired to provide a means of improving phase separation and alleviating the above-mentioned problems without affecting mass-transfer of the uranium into the organic phase.

It is, therefore, an object of our invention to provide a method of promoting rapid coalescence of mixed aqueous and organic phases in liquid-liquid extraction.

Another object is to provide a method of preventing formation of emulsions in extraction of uranium from nitric acid solution with tributyl phosphate.

Another object is to provide a method of preventing deposition of solids at the aqueous-organic interface in columns wherein said uranium extraction is carried out.

Another object is to provide a method of improving the performance of recycled tributyl phosphate in said process.

Another object is to provide a method of increasing throughput in liquid-liquid extraction.

Other objects and advantages will be apparent from the following detailed description and claims.

In accordance with our invention, separation of aqueous and organic phases in a liquid-liquid extraction system is improved by providing a finely divided additive selected from the group consisting of nickel metal and the nickel arsenides NiAs and $NiAs_2$ in the system. These additives promote coalescence of the mixed phases and substantially decrease the time required for phase separation. Increased throughputs are obtained without any decrease in the transfer of extracted material into the organic phase. The size of dispersed liquid drops is much larger and emulsion formation is minimized. When used in combination with absorbent material such as sand, these additives improve the performance of used solvent containing decomposition products.

We have found that nickel metal and nickel arsenides exert a strong influence on liquid surface characteristics at the organic-aqueous interface. Although the mechanism for the action of these materials is not known, it is postulated that hydrophobic and hydrophilic groupings in their molecules exert attractive forces which orient the particles in a lateral and longitudinal direction, with the stronger force being exerted in the lateral direction. This behavior is in contrast to normal surfactants, which are oriented principally in the longitudinal direction. The combination of these forces attracts and holds these materials as a film at the interface despite the fact that their densities should cause them to settle. This film strongly affects the behavior of dispersed droplets and promotes a rapid, clean separation of phases.

Nickel arsenides of the formulas NiAs and $NiAs_2$, which materials are available as the naturally occurring minerals niccolite and rammelsbergite, respectively, are both highly effective in promoting phase separation. These compounds may also be employed in artificially synthesized form. Nickel metal may also be employed, but the arsenides are preferred because they are more effective and less sensitive to chemical destruction by the extraction environment. In addition, limited work has shown that other finely divided metals such as silver, copper and iron and their sulfides and oxides may have a beneficial effect on phase separation.

An additive concentration of at least about 1000 parts per million (based on the weight of the organic phase) is required for a substantial decrease in coalescence time, and 2000 to 4000 parts per million is preferred. Higher concentrations may be required for continuous operation in systems which tend to dissolve the additive. The additive must be in a finely divided state to be effective, and a particle size less than 200 mesh (U.S. Sieve Series) is preferred.

Although illustrated herein primarily with reference to the extraction of uranium from nitric acid solution with tributyl phosphate, the method of our invention is broadly applicable to any extraction system wherein an aqueous liquid phase is contacted with an organic liquid phase. In addition to the systems mentioned above, this method has been found effective for the following specific systems: aqueous phase, 0.5 molar uranyl chloride, 1.0 molar hydrochloric acid–organic phase, 33 volume percent tributyl phosphate in kerosene; aqueous phase, 0.5 molar uranyl chloride, 1.0 molar hydrochloric acid–organic phase, 20 volume percent Aliquat 336 (a trade name for a quarternary amine) in a hydrocarbon diluent; aqueous phase, water adjusted to pH 0.5 with nitric acid–organic phase, n-octanol; and aqueous phase, water adjusted to pH 0.5 with nitric acid–organic phase, benzene and other hydrocarbons. The additives of our invention function only in the solid state and are rendered ineffective by dissolution. Accordingly, these materials must be replenished periodically in systems which dissolve them. The nickel arsenides are relatively insoluble, except in acids such as nitric and sulfuric at high acid concentration and high temperature. Nickel metal dissolves more readily in acid systems so that the arsenides are preferred.

The additives of our invention may be employed in combination with an inert material which has absorbent properties to improve the performance of used solvent containing soluble decomposition products, which are known emulsion contributors. The absorbent material for this embodiment is not critical, and sand may be employed. It is preferred to use finely divided sand having a particle size less than 200 mesh. The coalescence-promoting additive is combined with the absorbent at a proportion of 20 to 80 weight percent of the former, and preferably about 50 weight percent and the balance absorbent. NiAs is the most effective for this embodiment and is therefore preferred. The combined additives are provided in the used-solvent extraction system at a total weight of 2000 to 4000 parts per million, based on the weight of the organic phase. This combination is particularly effective for used tributyl phosphate in the extraction of uranium from nitric acid solution. Coalescence time is reduced to a level of only 10 to 20 percent of the value without additive under typical conditions, and solvent which would otherwise be inoperable in extraction column because of poor coalescence is rendered suitable for extended further use by this means.

The method of our invention is not limited to a particular extraction method or apparatus, and the additives described above may be employed for any conventional process such as pulse-column or mixer-settler extraction.

Our invention is further illustrated by the following examples.

EXAMPLE I

A series of tests was conducted to determine the effect of additives on phase separation. In each test the aqueous phase was a 3.0 normal nitric acid solution containing uranyl nitrate at a level of 200 grams uranium per liter. The organic phase was a 33 volume percent solution of tributyl phosphate in kerosene which had been used for an extended period for uranium extraction and which had a high content of solvent decomposition products. In each test 25 milliliters each of organic and aqueous phase along with additive were added to a 50 milliliter cylinder. The cylinder was rotated rapidly end over end for four minutes to mix the two phases. The cylinder was then allowed to stand upright and the time in seconds required for complete coalescence of two phases was measured. Nickel metal, niccolite (NiAs) and rammelsbergite (NiAs) having a particle size less than 200 mesh were added at levels of 2000 and 4000 parts per million, based on the weight of the organic phase. The results obtained may be seen by reference to the following table.

Table I

EFFECT OF NICKEL ARSENIDES AND NICKEL ON COALESCENCE TIME OF USED SOLVENT

| Additive: | Coalescence time (seconds) |
|---|---|
| None | 1340 |
| Nickel metal— | |
|   2000 p.p.m. | 580 |
|   4000 p.p.m. | 450 |
| Niccolite— | |
|   2000 p.p.m. | 280 |
|   4000 p.p.m. | 170 |
| Rammelsbergite— | |
|   2000 p.p.m. | 195 |
|   4000 p.p.m. | 310 |

It may be seen that all of the additives used decreased the coalescence time substantially.

EXAMPLE II

A series of tests was conducted to determine the effect of using the nickel arsenide additives in combination with various proportions of sand. The procedure of Example I was followed, except that both new and used organic solvent (33.5 volume percent tributyl phosphate in kerosene) were used for each additive combination, and 4000 parts per million total additive, based on the weight of the organic phase, was used. The results obtained may be seen by reference to the following table.

Table II

EFFECT OF NICKEL ARSENIDES AND SAND ON SOLVENT COALESCENCE TIME

| Material added | Coalescence time (seconds) | |
|---|---|---|
| | New solvent | Used solvent |
| None | 82 | 965 |
| Niccolite (NiAs) | Instant | 167 |
| 10 wt. percent Niccolite plus sand | 110 | 197 |
| 20 wt. percent Niccolite plus sand | 80 | 145 |
| 35 wt. percent Niccolite plus sand | 32 | 117 |
| 50 wt. percent Niccolite plus sand | Instant | 59 |
| Rammelsbergite (NiAs$_2$) | Instant | 310 |
| 20 wt. percent Rammelsbergite plus sand | 84 | 225 |
| 50 wt. percent Rammelsbergite plus sand | 21 | 70 |
| Sand | 135 | 645 |

It may be seen from the above that the combination of nickel arsenides with sand is more effective than the arsenides only for used solvent, apparently because of absorption of solvent decomposition products by the sand. At arsenide proportions of 35 percent and higher the combined additive is also effective for new solvent.

EXAMPLE III

Further tests were conducted by the procedure of Example I to determine the effect of nickel arsenide additives on other liquid-liquid systems.

Further details may be seen by reference to the following table.

TABLE III
EFFECT OF NICKEL ARSENIDES ON OTHER LIQUID-LIQUID SYSTEMS

| Additive: | | | |
|---|---|---|---|
| Aqueous Phase | 0.5 M $UO_2Cl_2$ 1.0 M HCl | 0.5 M $UO_2Cl_2$ 1.0 M HCl | Water adjusted to pH 0.5 with nitric acid |
| Organic Phase | 33 volume percent tributyl phosphate in kerosene | 20 volume percent Aliquat 336 (a quaternary amine) in hydrocarbon diluent | n-Octanol |
| | Coalescence time (seconds) | | |
| None | 62 | 135 | 25 |
| Niccolite (NiAs) 2000 parts per million, organic weight basis | 1.5 | 70 | 2 |
| Rammelsbergite ($NiAs_2$) 2000 parts per million, organic weight basis | 16 | | |

It may be seen from the above that nickel arsenides are effective for liquid-liquid systems of widely varying compositions.

The above examples are merely illustrative and are not to be understood as limiting the scope of our invention, which is limited only as indicated by the appended claims. Having thus described our invention, we claim:

1. The method of promoting phase separation in liquid-liquid solvent extraction wherein an aqueous phase and an organic solvent phase are contacted in an extraction zone and the resulting mixed phases are separated which comprises providing in said zone a finely divided additive selected from the group consisting of nickel metal and the nickel arsenides NiAs and $NiAs_2$.

2. The method of claim 1 wherein said additive is provided at a proportion of 2000 to 4000 parts per million, based on the weight of said organic phase.

3. In the process for purification of uranium values which comprises contacting a nitric acid solution containing said uranium values, together with impurities, with an organic solution of tributyl phosphate in an inert organic diluent in an extraction zone whereby said uranian values are selectively extracted into said organic solution and separating the resulting uranium-bearing organic phase from the resulting aqueous phase, the improvement which comprises providing a finely divided additive selected from the group consisting of nickel metal and the nickel arsenides NiAs and $NiAs_2$ in said zone.

4. The improvement of claim 3 wherein said additive is provided at a proportion of 2000 to 4000 parts per million based on the weight of said organic phase.

5. In the process for purification of uranium values which comprises contacting a nitric acid solution containing said uranium values, together with impurities, with an organic solution of tributyl phosphate in an inert organic diluent in a first extraction zone whereby said uranium values are selectively extracted into said organic solution, separating the resulting uranium-bearing organic phase from the resulting aqueous phase, stripping said uranium values from said organic phase, contacting the resulting used solvent with fresh uranium-bearing nitric acid solution in a second extraction zone whereby said uranium values are extracted into said used solvent and separating the resulting aqueous phase from the resulting uranium-bearing organic phase, the improvement which comprises providing an absorbent and an additive selected from the group consisting of nickel metal and the nickel arsenides NiAs and $NiAs_2$ in said second extraction zone.

6. The improvement of claim 5 wherein said additive is provided at a proportion of 20 to 80 weight percent of the total weight of absorbent and additive.

7. The improvement of claim 6 wherein said additive and said absorbent are provided at a proportion of 2000 to 4000 parts per million based on the weight of said used solvent phase.

8. The improvement of claim 7 wherein said additive is NiAs.

9. The improvement of claim 7 wherein said absorbent is finely divided sand.

No references cited.

CARL D. QUARFORTH, *Primary Examiner.*